UNITED STATES PATENT OFFICE.

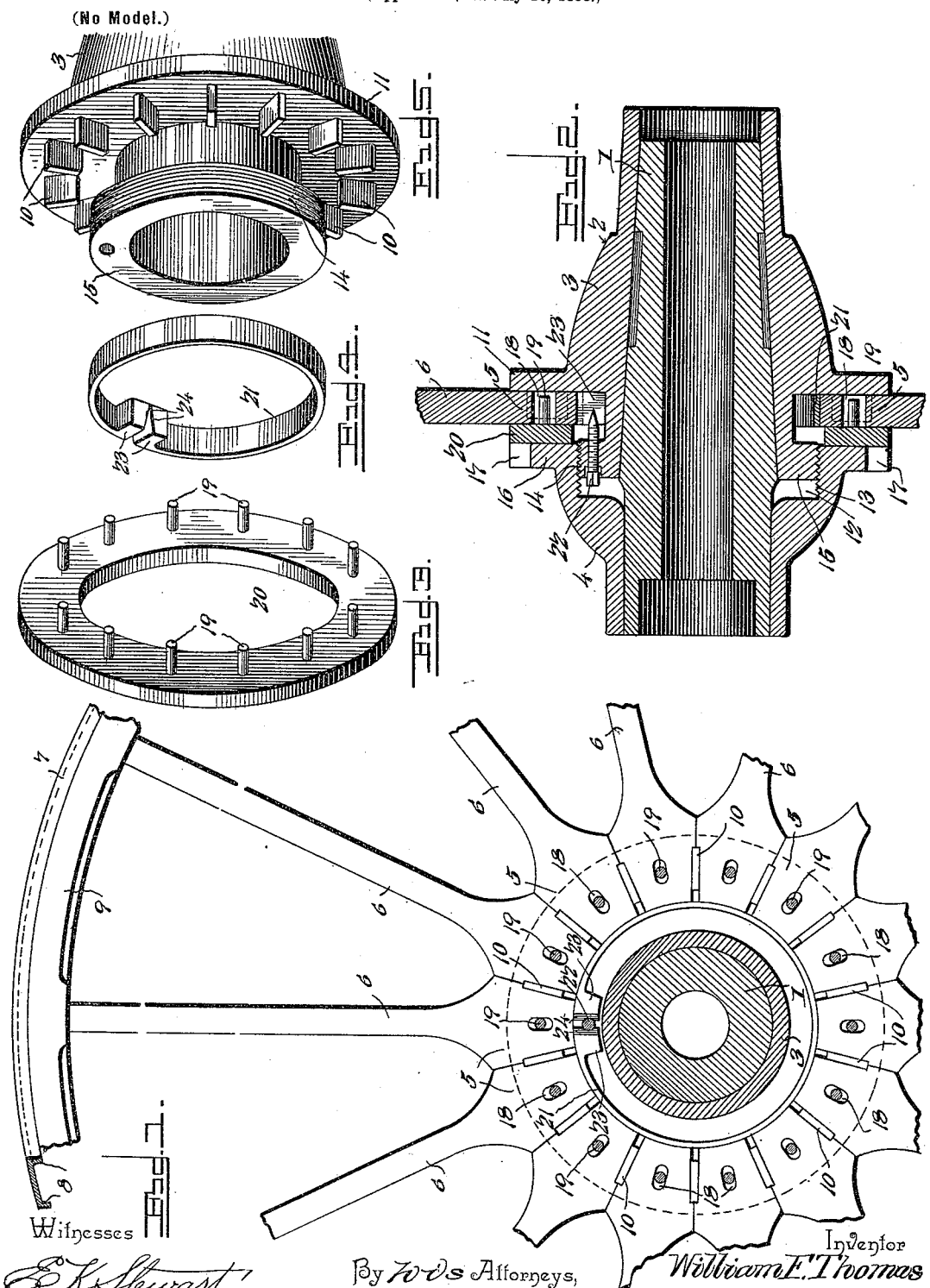

WILLIAM F. THOMAS, OF BURLINGTON, IOWA.

VEHICLE-WHEEL.

SPECIFICATION forming part of Letters Patent No. 641,736, dated January 23, 1900.

Application filed July 10, 1899. Serial No. 723,360. (No model.)

*To all whom it may concern:*

Be it known that I, WILLIAM F. THOMAS, a citizen of the United States, residing at Burlington, in the county of Des Moines and State of Iowa, have invented a new and useful Vehicle-Wheel, of which the following is a specification.

The invention relates to improvements in vehicle-wheels.

The object of the present invention is to improve the construction of vehicle-wheels and to provide a simple and comparatively inexpensive one capable of enabling its tire to be readily tightened, when desired, to obviate the necessity of upsetting the same and adapted to permit its spokes to be readily removed and renewed should they become broken or otherwise injured.

The invention consists in the construction and novel combination and arrangement of parts hereinafter fully described, illustrated in the accompanying drawings, and pointed out in the claims hereto appended.

In the drawings, Figure 1 is a sectional view of a portion of a wheel constructed in accordance with this invention. Fig. 2 is a sectional view taken at right angles to Fig. 1. Fig. 3 is a detail perspective view of the spoke-engaging ring. Fig. 4 is a similar view of the expansible ring. Fig. 5 is a perspective view of the inner portion of the main section of the hub-casing.

Like numerals of reference designate corresponding parts in all the figures of the drawings.

1 designates a hub provided with a casing receiving a body portion 2 and composed of inner and outer sections 3 and 4, detachably secured together and receiving the inner ends 5 of the spokes 6 of the wheel between them. The outer ends of the spokes are arranged in suitable sockets of felly-sections 7, fitting within a groove formed by side flanges 8 of a tire 9 and provided at opposite sides with recesses to receive the said flanges 8. The inner ends of the spokes are tapered and arranged in an annular series of spaces formed by radially-disposed flanges 10, formed integral with a continuous outwardly-extending annular flange 11 of the section 3 of the hub-casing. The continuous annular flange 11 is located near the inner end of the main section 3, and the lugs or flanges 10, which are substantially rectangular, as clearly shown in Fig. 5 of the accompanying drawings, extend from the inner face of the annular flange 11. The inner section 4 of the hub-casing is provided at its inner end with an interior annular recess 12, having interior screw-threads 13 and engaging exterior threads 14 of an annular flange 15, located at the inner extremity of the main or outer section 3. The section 4 is provided at its inner end with an annular flange 16, arranged parallel with the flange 11 of the section 3 and provided with peripheral recesses 17 and adapted to be engaged by a suitable spanner or other tool, whereby the inner removable section may be readily screwed on and off the outer or main section.

The inner ends of the spokes, which are clamped between the outwardly-extending annular flanges 11 and 16 of the sections of the hub-casing, are provided with short longitudinal slots 18, which receive pins 19 of a spoke-engaging ring 20, interposed between the spokes and the flange 16 of the removable section 4. The pins, which are arranged in an annular series, as clearly illustrated in Fig. 3 of the accompanying drawings, support the spokes and increase the strength of the hub and at the same time permit a limited longitudinal movement of the said spokes.

The tire is maintained perfectly tight by an expanding device consisting of a ring 21 and a screw 22. The ring, which is split, as illustrated in Fig. 4 of the accompanying drawings, is provided at the split portion with inwardly-extending lugs 23, arranged at the terminals of the metal of the ring and having beveled inner faces 24, which are adapted to be engaged by the adjusting-screw 22, and the latter has its inner engaging end tapered, as shown in Fig. 2. The adjusting-screw, which is disposed longitudinally of the hub, is mounted in a threaded perforation of the threaded annular flange 15 of the main section of the casing, and the said flange 15 is provided at the outer end of the threaded perforation with a recess to receive the head of the screw. The expanding device engages the inner end of all the spokes, as clearly illustrated in Fig. 1 of the accompanying drawings, and by this construction the tire is maintained perfectly tight, and the tension may be increased at any time. The inner faces of the lugs of the expansible ring are arranged at an angle to each other and present a flaring or tapered opening to the engaging end of the screw.

The invention has the following advantages: The wheel, which is simple and comparatively inexpensive in construction, is adapted to have its parts readily assembled. The felly-sections may be easily introduced into the groove or channel of the tire, and the spokes may be quickly connected with the hub and the felly. The expansible ring, which engages the inner ends of the spokes, maintains the tire tight at all times and readily takes up any looseness of the parts. The inner section of the casing may be readily detached, and it will permit the spokes to be readily removed and renewed when broken or otherwise injured. The pins, which are arranged within the slots of the inner ends of the spokes, support the same against lateral movement and prevent the wheel from getting out of true should the inner ends of the spokes be forced outward, so that they do not entirely fill the space between the radial lugs.

Changes in the form, proportion, size, and the minor details of construction within the scope of the appended claims may be resorted to without departing from the spirit or sacrificing any of the advantages of this invention, such as employing various means for securing the body portion of the hub within the casing.

What is claimed is—

1. A device of the class described comprising a hub, spokes, a split expansible ring engaging the inner ends of the spokes, and an adjustable screw interposed between the ends of the split ring and adapted to expand the latter, substantially as described.

2. A device of the class described comprising a hub composed of separable sections, spokes interposed between the sections of the hubs and provided with slots, and a removable ring arranged within the hub and provided with pins extending into the slots of the spokes, substantially as described.

3. A device of the class described comprising a hub, spokes, and an expanding device composed of a split ring engaging the inner ends of the spokes and provided with beveled lugs, and a screw engaging the beveled faces of the lugs and adapted to expand the ring, substantially as described.

4. A device of the class described comprising the main section having an outwardly-extending annular flange provided with radial lugs forming spoke-sockets, slotted spokes fitting between the lugs, a ring provided with pins extending into the slots of the spokes, a removable section detachably secured to the main section and engaging the ring, and an expanding device, substantially as described.

5. A device of the class described comprising a main section having an outwardly-extending annular flange provided with radial lugs, a removable section having an annular recess, slotted spokes fitting between the lugs, a ring interposed between the spokes and the removable section and provided with pins fitting in the slots, an expansible ring arranged within the hub and engaging the inner ends of the spokes, and a screw mounted on the main section and engaging the ring, substantially as described.

6. A device of the class described comprising a main section having annular flanges 11 and 15, the flange 15 being threaded, and provided with a threaded perforation, an expansible ring fitting between the said flanges, a screw mounted in the threaded perforation and engaging the ring, and a removable section having interior screw-threads to engage those of the flange, substantially as described.

In testimony that I claim the foregoing as my own I have hereto affixed my signature in the presence of two witnesses.

WILLIAM F. THOMAS.

Witnesses:
SAMUEL PEABODY,
J. S. PENNINGTON.